(12) United States Patent
Callinan et al.

(10) Patent No.: US 10,883,227 B2
(45) Date of Patent: Jan. 5, 2021

(54) ARTICLES WITH ADHESIVE SEPARATION LAYER

(71) Applicant: 3M INNOVATIVE PROPERTIES COMPANY, St. Paul, MN (US)

(72) Inventors: Andrew J. Callinan, Shoreview, MN (US); David M. Mahli, Woodbury, MN (US); Mitchell A. F. Johnson, Maplewood, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 512 days.

(21) Appl. No.: 14/655,539

(22) PCT Filed: Dec. 27, 2013

(86) PCT No.: PCT/US2013/077994
§ 371 (c)(1),
(2) Date: Jun. 25, 2015

(87) PCT Pub. No.: WO2014/106055
PCT Pub. Date: Jul. 3, 2014

(65) Prior Publication Data
US 2015/0353777 A1  Dec. 10, 2015

Related U.S. Application Data

(60) Provisional application No. 61/747,071, filed on Dec. 28, 2012.

(51) Int. Cl.
*D21H 27/00* (2006.01)
*D21H 19/20* (2006.01)
(Continued)

(52) U.S. Cl.
CPC ............. *D21H 27/001* (2013.01); *B32B 3/30* (2013.01); *B32B 29/002* (2013.01); *B32B 29/04* (2013.01);
(Continued)

(58) Field of Classification Search
CPC ........ C09J 7/0228; C09J 7/0232; C09J 7/046; C09J 7/047; C09J 7/40; C09J 7/401;
(Continued)

(56) References Cited

U.S. PATENT DOCUMENTS 3,691,140 A   9/1972  Silver
5,032,460 A   7/1991  Kantner
(Continued)

FOREIGN PATENT DOCUMENTS

JP   H05-140890   6/1993
JP   1161094      3/1999
(Continued)

OTHER PUBLICATIONS

Merriam-Webster Online Dictionary, "Latex", https://www.merriam-webster.com/dictionary/latex (Year: 2006).*
(Continued)

*Primary Examiner* — Scott R. Walshon
*Assistant Examiner* — Jasper Saberi
(74) *Attorney, Agent, or Firm* — Eric E. Silverman (57) ABSTRACT

Articles comprising: (1) a sheet having a first surface and a second surface and (2) an separation layer on at least a portion of the first surface, wherein the separation layer comprising (a) a binder layer with particles entrained therein and (b) an overcoat. Also methods for making such articles and methods for using such articles.

29 Claims, 2 Drawing Sheets

(51) Int. Cl.
| | |
|---|---|
| *D21H 19/56* | (2006.01) |
| *D21H 21/54* | (2006.01) |
| *C09J 7/22* | (2018.01) |
| *C09J 7/40* | (2018.01) |
| *C09J 7/20* | (2018.01) |
| *C09J 7/21* | (2018.01) |
| *B32B 29/04* | (2006.01) |
| *B32B 3/30* | (2006.01) |
| *B32B 29/00* | (2006.01) |
| *C08K 7/22* | (2006.01) |
| *C08K 7/16* | (2006.01) |

(52) U.S. Cl.
CPC .............. *C09J 7/201* (2018.01); *C09J 7/203* (2018.01); *C09J 7/21* (2018.01); *C09J 7/22* (2018.01); *C09J 7/40* (2018.01); *C09J 7/401* (2018.01); *C09J 7/403* (2018.01); *C09J 7/405* (2018.01); *D21H 19/20* (2013.01); *D21H 19/56* (2013.01); *D21H 21/54* (2013.01); *B32B 2255/12* (2013.01); *C08K 7/16* (2013.01); *C08K 7/22* (2013.01); *C09J 2301/122* (2020.08); *C09J 2301/41* (2020.08); *C09J 2400/283* (2013.01); *C09J 2425/005* (2013.01); *C09J 2429/005* (2013.01); *C09J 2433/005* (2013.01); *C09J 2475/005* (2013.01); *Y10T 156/1111* (2015.01); *Y10T 428/24372* (2015.01); *Y10T 428/24405* (2015.01); *Y10T 428/24413* (2015.01)

(58) Field of Classification Search
CPC ......... C09J 7/403; C09J 7/405; D21H 27/001; Y10T 428/24372; B32B 3/30; B32B 29/002; B32B 29/04; B32B 2255/12
See application file for complete search history.

(56) References Cited

U.S. PATENT DOCUMENTS

| | | | |
|---|---|---|---|
| 5,045,569 A | | 9/1991 | Delgado |
| 5,478,880 A | * | 12/1995 | Shipston ................. B41M 5/44 524/527 |
| 5,631,064 A | | 5/1997 | Marecki |
| 6,015,615 A | | 1/2000 | Sanchez |
| 8,110,280 B2 | | 2/2012 | Graham |
| 2002/0170690 A1 | * | 11/2002 | Buchsel ............... D21H 27/001 162/109 |
| 2007/0100306 A1 | * | 5/2007 | DiZio .................... A61F 13/58 604/371 |
| 2009/0246478 A1 | * | 10/2009 | Graham ................. B42D 5/002 428/192 |
| 2012/0121893 A1 | * | 5/2012 | Iyengar ................. C09J 7/0228 428/327 |
| 2012/0322937 A1 | * | 12/2012 | Zeysing ................ C09J 7/0228 524/506 |
| 2013/0149497 A1 | * | 6/2013 | Enniss .................... B32B 19/02 428/150 |

FOREIGN PATENT DOCUMENTS

| | | | |
|---|---|---|---|
| JP | H11-321160 | | 11/1999 |
| JP | 2002-086622 | | 3/2002 |
| JP | 2002-302895 | | 10/2002 |
| JP | 2003-091090 | | 3/2003 |
| JP | 2006307386 A | * | 11/2006 |
| JP | 2007-283653 | | 11/2007 |
| JP | 2011-173362 | | 9/2011 |
| WO | WO 1994-19420 | | 9/1994 |
| WO | WO 98/28378 | | 12/1996 |
| WO | WO 2011-124476 | | 10/2011 |

OTHER PUBLICATIONS

Merriam-Webster Online Dictionary, "Emulsion", https://www.merriam-webster.com/dictionary/emulsion (Year: 2006).*
Translation of description of JP-2006307386-A (Year: 2006).*
International Search Report for PCT International Application No. PCT/US2013/077994 dated May 8, 2014, 4 pages.
Rudof Risen et al.: "Glass transition temperature measured using various TA techniques, Part 2: Determination of glass transition temperatures", Feb. 1, 2003, pp. 1-20, XP002594785, retrieved from the internet on Aug. 2, 2010.
Hans-Georg Elias: "Macromolecules", vol. 1: Fundamentals, 5$^{th}$ Edition, Jan. 1, 1990, Heidelberg New York, pp. 845-857, XP002594550, ISBN: 978-3-85739-101-9.
Erich Penzel et al. : Some properties of copolymers of vinylidene chloride with acrylates and methacrylates, Part 1, Angewandte Makromolekulare Chemie. Applied Macromolecularchemistry and Physics, Wiley CVH, Weinheim, DE, vol. 273, No. 4703, Jan. 1, 1999, pp. 15-27, XP002594551, ISSN: 0003-3146.
"Katalog Handbuch Feinchemikalien, product No. 18,206-0", Jan. 1, 1999, Katalog Handbuch Feinchemikalien, Aldrich, p. 1588, XP 002594552.

* cited by examiner

ARTICLES WITH ADHESIVE SEPARATION LAYER

FIELD

The present invention relates to articles with an adhesive separation layer thereon, i.e., release liners for use with adhesive-backed articles, adhesive-backed articles which are to be arrayed in padded or roll form, etc.

BACKGROUND

Articles comprising pressure sensitive adhesives are widely used, common examples including tapes, labels, and adhesive notes, etc.

In many instances, pressure sensitive adhesive articles are constructed with a releasable liner to protect the adhesive during storage until it is called upon for application to various substrates. Conventional liners, typically a silicone-coated paper, cannot be recycled efficiently by standard paper recycling processes and must be separated from today's mixed paper recycling waste streams. Furthermore, articles bearing an important class of pressure sensitive adhesives known as permanent adhesives require the use of such liners to enable delivery of the adhesive in application. Without a liner, the permanent adhesive would develop undesired adhesions to other objects as well as bind to itself, e.g., roll blocking. After removal of the liner from the permanent adhesive to permit attachment of the adhesive-bearing article, the liner is disposed of. Such uses of liners for adhesive articles are expensive, wasteful, and unsustainable.

In some cases where the articles are arrayed in padded or roll form, the side of the article opposite that on which the adhesive is present is treated with a release agent to permit the articles to be separated, i.e., as in removal of a sheet from a pad, or unrolled, i.e., as in unwinding of tape from a roll. Such release agents can entail added cost as well as fail to provide desired properties, e.g., sufficient release from permanent adhesives while maintaining desired writability characteristics.

The need exists for improved adhesive separation layers that are effective with a broad range of adhesives.

SUMMARY

The present invention provides articles having adhesive separation layers thereon.

In brief summary, articles of the invention comprise: (1) a base having a first surface and (2) a separation layer on at least a portion of the first surface. In accordance with the invention, the separation layer comprises a binder layer with particles partially entrained therein and protruding therefrom and a release agent. The release agent may be an overcoat on the face of the separation layer or may be incorporated in the binder layer. In many embodiments, the base will be a sheet having a first and second surface, e.g., a sheet of paper. In some embodiments the article will further comprise an adhesive, e.g., a pressure sensitive adhesive, on the second surface of the sheet. In many such embodiments, the articles are arranged in an assembly, e.g., one or more articles wound into roll form or stacked in a padded arrangement such that the adhesive on an overlying article or portion thereof is in contact with the separation layer of an underlying article or portion thereof.

In addition, the invention provides a method for making such articles that, briefly summarizing, comprises providing a base having a first surface and forming a separation layer thereon.

Further, the invention provides a method for using articles of the invention that, in brief summary, comprises: (1) providing the article wherein the base comprises a water dispersible material and, and after use of such article, (2) placing the article in water, (3) water dispersing the article, and (4) recovering the base material.

It has been unexpectedly discovered that separation layers of the invention provide superior adhesive release and other properties. For instance, clean, easy release from strongly tacky adhesives, i.e., sometimes called "permanent" adhesives, is possible. In addition, the separation layers exhibit other desirable characteristics including writability, smear resistance, flexibility, and recyclability. As used herein, the term "recyclable" is used to refer to articles that are sufficiently water dispersible to be successfully processed in conventional paper recycling operations from which fiber can be recovered for reuse in making paper.

As a result, articles of the invention can be adapted for myriad applications. Illustrative embodiments of articles of the invention include repulpable release liners, padded notes, easel pads, tapes, and more.

BRIEF DESCRIPTION OF DRAWING

The invention is further explained with reference to the drawing wherein:

FIG. 1 is not to scale and is idealized; these Figs. are intended to be merely illustrative and not limiting.

KEY AND GLOSSARY

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

DETAILED DESCRIPTION OF ILLUSTRATIVE EMBODIMENTS

Figure 1:
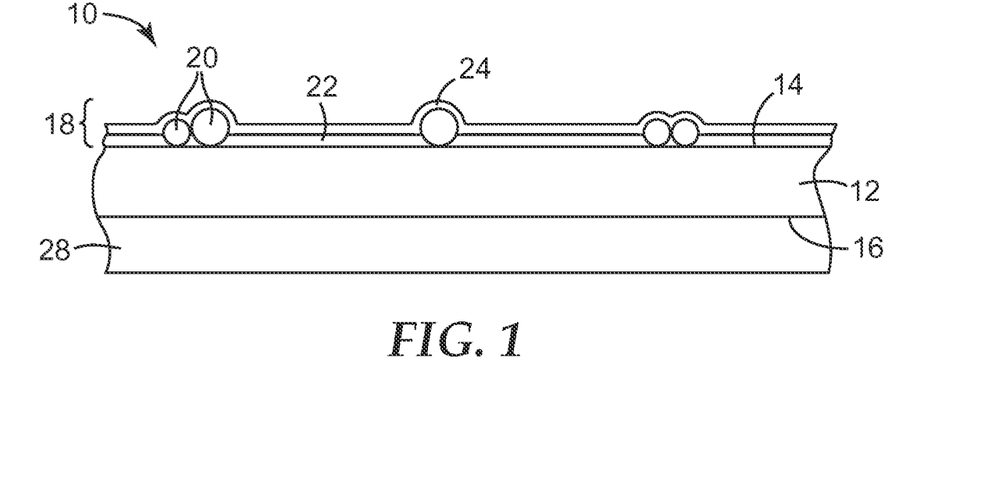
FIG. 1 is a cross sectional view of a portion of an illustrative embodiment of the invention.

As discussed above, articles of the invention comprise a sheet and a separation layer on a first surface thereof. FIG. 1 is a cross sectional view of a portion of an illustrative embodiment of the invention wherein article 10, e.g., an adhesive tape, comprises base 12 having first surface 14 and second surface 16. At least a portion of first surface 14 is covered with a separation layer 18 which comprises particles 20 partially entrained in and protruding from binder layer 22. In addition, the separation layer 18 comprises a release agent overcoat 24 on the face 26 thereof. In addition, article 10 further comprises an optional adhesive layer 28 on the second surface of base 12.

Base

Suitable materials for the base can be readily selected by those skilled in the art, dependent in large part upon the intended application. For example, in many embodiments the base will be a sheet selected for desired properties, e.g., color, tensile strength, tear resistance, flexibility, elasticity, resilience, dimensional and configurational stability, etc.

Illustrative examples of suitable materials include sheets of various papers, cardboards, and the like. Though well suited for use in applications intended to be recyclable, i.e., processed in water dispersible operations, the advantages of adhesive protection and release may also be attained using other kinds of base materials that are not recycled in that fashion, e.g., such as plastic sheets, metalized films, etc. Illustrative examples of suitable substrates or sheets for use in the present disclosure include, in addition to those mentioned above, woven or non-woven fabrics comprises of synthetic or natural materials, typically preferably calendared, plastic films, cellulose acetate, ethyl cellulose, metal, metallized polymeric film, ceramic sheet material and the like.

Thickness of the base is not important to the present invention and will depend essentially upon the intended application of the resultant article. In some embodiments, the base is a sheet material having a thickness of from about 25 to about 155 micrometers, although thicker and thinner materials are not precluded.

Depending upon the embodiment, the sheet may be of monolayer or multilayer construction. In some embodiments, the base may consist essentially of a sheet of paper. For many applications, preferred paper sheets are those with suitable water hold-out to enable water-based coating without excessive sheet distortion. For instance, 3M™ Easel Pads are made with a plurality of paper sheets of low basis weight paper, e.g., 70 grams/m², with a bleed through resistant coating. The present invention may be used on such products to provide desired inter-sheet adhesion and good writability properties Separation Layer Separation layers of the invention comprise a binder layer with particles partially entrained therein and protruding therefrom. In addition, the separation layers comprise a release agent which may be incorporated as a component of the binder layer or applied as an overcoat on the binder layer and protruding particles.

Binders

In articles of the present invention, the binder acts as the vehicle to hold the particles to the first surface of the base.

The binder must be strong enough to hold the particles in place on the surface during manufacture and handling of the article. In embodiments where the base is flexible and is subject to being flexed into different configurations, e.g., a tape wound into roll form or a sheet applied to a curved surface, the binder should be flexible enough to bend with the base while retaining the entrained particles. An important property impacting this characteristic is the glass transition temperature ("$T_g$") of the dried polymer. Polymer latexes useful for articles of the invention used in conventional environments preferably have a $T_g$ from about −30° C. to about +30° C., more preferably from about −20° C. to about +10° C., and most preferably from about −15° C. to about 0° C. If the $T_g$ is too low, the resultant binder layer may tend to be too stiff and be subject to cracking, impede desired softness or flexibility of the base, depending upon the embodiment. If the $T_g$ is too high, the resultant binder layer may tend to be too gummy or sticky, making it less convenient or pleasing to work with, depending upon the embodiment.

Illustrative examples of binders suitable for use in articles of the invention include polymer latexes, emulsions, or dispersions commonly known in the paper industry. Typically preferred binders are water-based acrylic polymers made up of monomers for example such as: vinyl acetate, styrene, butadiene, butyl acrylate, acrylic acid, and acrylonitrile. In some cases, solvents may also be employed as part of the polymer binder solution.

Blends of polymer latexes may also be useful for the present invention.

Illustrative examples of useful polymer latex binders include modified styrene acrylic polymers such JONCRYL™ 74A from BASF, which is often preferred for its performance in applications where repulping of paper is carried out; acrylic polymers such as HYCAR™ 26469 and 26083, HYSTRETCH™ V-29, and CARBOSET™ AE960 from Lubrizol, and RHOPLEX™ A-920 and RHOPLEX™ NW-1725K from Dow Chemical Co.; acrylic latexes such as SYNTHEMUL™ 40 series from Reichhold; vinyl acetate-ethylene emulsions such as AIRFLEX™ 192 from Air Products and DUROSET™ E-230 from Celanese; acrylic dispersions such as AC2523 and M2064 from Alberdingk Boley, Inc, styrene-butadiene functional polymers such as GENCRYL™ from OMNOVA Solutions, Inc.; polyvinyl alcohols such as SELVOL™ from Sekisui Specialty Chemicals; and acrylics such as ECCO™ Resin P-009 from Eastern Color & Chemical Co. Other useful polymer binders may include various urethane dispersions such as U6150 and U933 from Alberdingk Boley, Inc.

To improve recyclability of paper based articles of the invention it is advantageous that the dried latex be water dispersible to enable repulping for recyclability. In these cases, hydrophilic functional groups such as carboxyl, hydroxyl, ethylene oxide, quaternary amine, etc. may constitute part of the latex binders.

In many embodiments, one or more additional adjuvants may be incorporated in the binder. Illustrative examples include thickener, biocide, surfactant, buffer, colorant, and the like.

Particles

Illustrative examples of particles useful in the present invention include small spherical particles that are organic, inorganic, or combinations thereof.

The particles typically have a polydisperse particle size distribution, in other words a range of sizes of, e.g., from about 5 to about 200 microns. In these instances, an average particle size is given for the particles. Monodisperse particles with a very small range of particle sizes of a several microns may also be useful. The average size of the particle is important for the present invention to create a microstructure on the release surface that is sufficient to minimize contact with the adhesive. However, larger average particle sizes detract from the ability to write on the surface and also result in a more shocky (less smooth feeling) peel when removing the adhesive. Average particle sizes useful for the present invention are from about 5 to about 60 microns, preferably from about 10 to about 50 microns, and most preferably from about 20 to about 40 microns.

Organic particles are typically made by suspension polymerization of various acrylic monomers such as: methacrylate, methamethacrylate, styrene, butyl acrylate, ethylhexyl acrylate (2-EHA), iso-octyl acrylate (IOA), acrylic acid, hexanediol diacrylate (HDDA), etc. Particularly useful particles, also called non-tacky microspheres, of the present invention are disclosed in U.S. Pat. No. 8,110,280 (Graham et al.). Some other illustrative examples of preferred organic particles include cross-linked acrylic particles, e.g., MR-30G from Esprix Technologies, and crosslinked polymethamethacrylate particles, e.g., SUNPMMA-S400 from Sunjin Chemical Co.

Useful inorganic particles are typically made of various forms of silica such as glass spheres SPHERIGLASS™ 3000 and hollow glass spheres Q-CEL™ 6048 from Potters Industries, LLC, silica beads such as SUNSIL™ 150H from Sunjin Chemical Co., hollow glass microspheres such as S60 from 3M Company, hollow glass particles such as SIL-43 from Silbrico Corporation, or ceramic beads such as G-600 from Zeeospheres Ceramics, LLC.

It also may be advantageous to have a surface coating on the particles to facilitate interactions with the binder and improve anchorage to the paper surface.

Particles used herein may be of any desired shape, including, e.g., spheroid, ovoid, and irregular. Particles used herein may be hollow or solid.

To form the separation layer, a coating composition comprising resin binder and the particles is applied to at least a portion of the first surface of the base and allowed to dry, leaving the desired separation coating of the invention. Application may be carried out by any suitable means, e.g., knife coating, curtain coating, drip coating, etc. The coating process is typically preferably a water-borne process but may be carried out in solvent-borne fashion provided that the resultant separation layer is water dispersible.

The amounts of binder and particles are selected such that, upon drying, a textured surface defined by particles, singly and in clusters, is formed.

Figure 2:
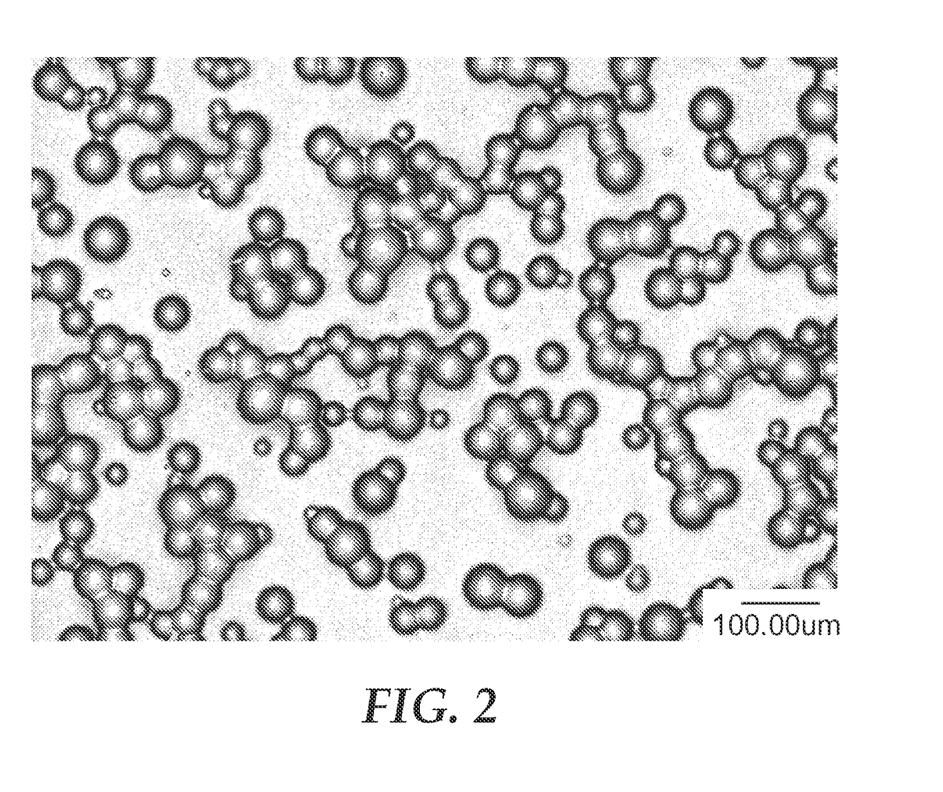
FIG. 2 is an image analysis of a portion, in plan view, of an illustrative embodiment of a separation layer of the invention.
Figure 3:
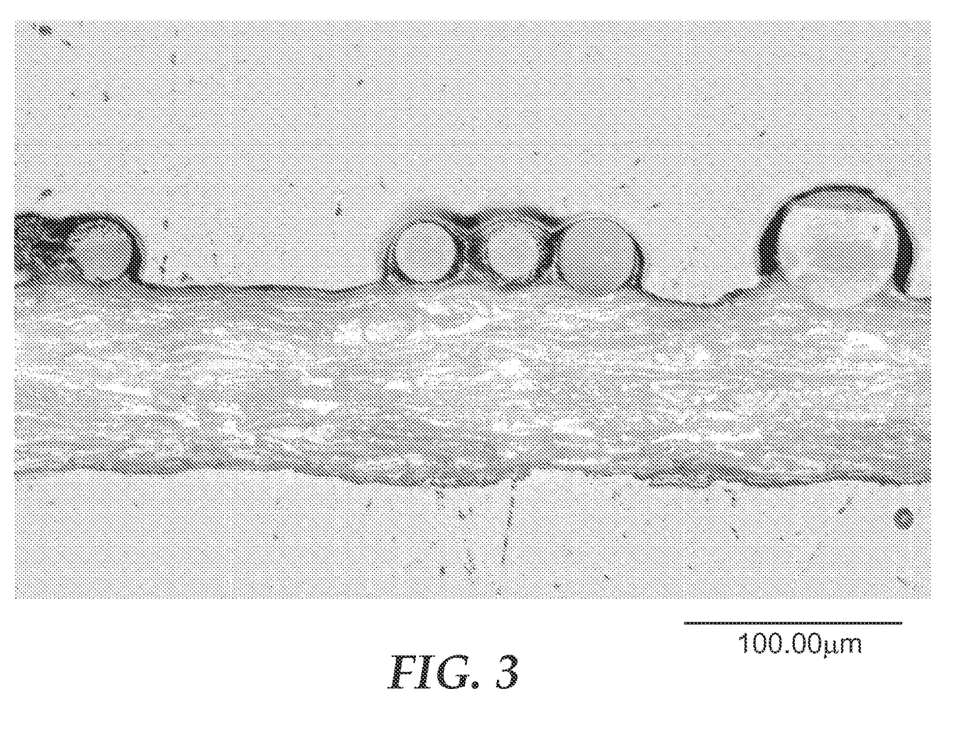
FIG. 3 is a digital microscopic photograph cross section of a separation layer on paper base sheet in accordance with an illustrative embodiment of the invention.

The particles are randomly dispersed and bound on the sheet surface with the binder. Particles may be individually dispersed or coalesced (grouped) with other particles to form larger clumps of two or more particles. FIG. 2 is an image analysis, with a Confocal scanning laser microscope, 50× object, of a representative separation layer of the present invention on a PET film base. FIG. 3 is a digital microscope imaging of a cross section of an separation layer on a paper base sheet in accordance with the invention:

Separation layers of the invention can be characterized using Confocal scanning laser microscopy to determine the following spatial features of the particles as follows.

Height (H): describes a measure in microns of the height from the top of a peak region minus the average height along the perimeter of the peak region. Illustrative embodiments of the invention have a mean H from about 10 to about 50 microns.

Equivalent Circular Diameter (ECD): describes a measure in microns of the diameter of the circle with the same area as the peak region. Illustrative embodiments of the invention have a mean ECD from about 50 to about 100 microns.

Nearest Neighbor Distance (NND): describes a measure in microns of the distance between the centroid of one peak region and the centroid of its nearest peak region. Illustrative embodiments of the invention have a mean NND from about 50 to about 150 microns.

A peak region is defined as a region on the surface occupied by a single isolated particle or a group of coalesced particles.

The particle clusters can characterized by analyzing height maps obtained by confocal scanning laser microscopy. A custom program identifies and sizes the peak regions. The program thresholds the height map after it has been filtered with a band pass spatial filter, which generates a binary image of the peak regions. The frequency cutoffs and threshold level are chosen so that the peak regions are well identified. H and ECD can be measured for each peak region and respectively averaged; the mean NND is estimated in two different ways. The mean nearest neighbor distance for points that are randomly positioned on a two dimensional surface of infinite extent is given by the following formula:

$$d = \sqrt{\frac{1}{2n}}$$

where d is the mean of the nearest neighbor distance and n is the number of points per unit area. Because distinct peak regions in the samples are not small and cannot overlap, this relationship is likely to underestimate the nearest neighbor distance for these samples. For points arranged in a square lattice, the mean nearest neighbor distance is:

$$d = \sqrt{\frac{1}{n}}$$

If n is accurately measured, the actual mean of the nearest neighbor distance is likely to lie between these two values.

In an illustrative embodiment, the first surface and the separation layer coating have a mean H of from about 10 to about microns, a mean ECD from about 50 to about 100 microns, and a mean NND of from about 50 to about 150 microns.

The ratio of binder to particles is important to have a sufficient quantity of binder to secure the particles on the base. For instance, in many embodiments the coating composition has a binder to particle weight ratio of about 4 to 1, preferably about 3 to 1, and most preferably about 1.5 to 1.

In addition, the quantity of coating composition, i.e., binder plus particles, etc., is important to achieving the advantages of the invention. Separation layers of the invention may be relatively thin. In many embodiments, the resultant separation layer has a dry coating weight of from about 5 to about 15 $g/m^2$, preferably from about 7 to about 12 $g/m^2$, and most preferably from about 8 to about 11 $g/m^2$. If too much coating composition is used, the particles will not disperse sufficiently so as to result in poorer release properties as well as possibly impairing potential recyclability or repulpability of the article. If too little coating composition is used, the particles will not be sufficiently securely bound to the article and will tend to pop off easily.

Release Agent

Separation layers of the invention also comprise a release agent. In some embodiments, the release agent is incorporated in the coating composition before it is applied to the surface of the base and will impart desired properties to the surface of the binder layer and typically also the portions of the surface of the particles that protrude from the binder layer. In other embodiments, the release agent is applied to the face of the separation layer as an overcoat after the binder layer and particles are coated on the surface of the base. The former embodiment is often preferred because it entails a simpler process and the resultant release agent properties are more securely anchored to the separation layer.

Illustrative examples of suitable release agents, sometimes referred to as low adhesion backsize ("LAB") coatings, include the vinyl-silicone copolymers disclosed in U.S. Pat. No. 5,032,460 (Kantner et al.). Other illustrative examples of suitable release agents include long chain aliphatic-containing urethane copolymers, long chain aliphatic-containing acrylate copolymers, silicone/polyurea copolymers, and silicone polyamide copolymers.

Preferably the LAB used is water-dispersible and render paper coatings that are uniquely recyclable.

Adhesive

In some embodiments, articles of the invention will further comprise an adhesive. The adhesive is typically a pressure sensitive adhesive, often normally tacky at room temperature. Depending upon the embodiment, the adhesive may be permanent, repositionable, or releasable as desired for the intended application. A typically preferred class of adhesives for use in articles of the invention is relatively stiff acrylics. Illustrative examples of suitable pressure sensitive adhesives include those selected from the group consisting of acrylates such as those available in office label products from UPM Raflatac. Other illustrative examples include microsphere adhesives such as those described in WO 94/19420 (Bilski et al.) and U.S. Pat. No. 3,691,140 (Silver) and U.S. Pat. No. 5,045,569 (Delgado). One skilled in the art would be able to select a suitable pressure sensitive adhesive for use in the present invention.

The layer of pressure sensitive adhesive is typically continuous although it may be discontinuous. Illustrative examples of discontinuous coatings include dots, stripes, etc. in regular or irregular array. The thickness of the adhesive will depend in large part upon the intended application and the properties of the other components of the article. Those skilled in the art will be able to readily select suitable thickness.

Applications

The surprising range of performance of articles of the invention enables their application in myriad applications.

For instance, the advantage release properties of separation layers of the invention permits articles of the invention to be adapted to be used as a release liner for so-called permanent adhesives. If desired, such embodiments can be made in repulpable form, thereby enabling recycling of such release liners. This sustainable practice is not feasible with the traditional silicone-coated release liners commonly used with permanent adhesives today.

In other embodiments, the good writability which can be attained with separation layers permits articles of the invention to be used for sheets in padded form, e.g., note pads, easel pads, etc. For example, many adhesive easel sheet pads employ relatively strong adhesives (to permit secure adhesion of a removed sheet to a wall or other surface), yet such sheets can easily become bound up, wrinkled, torn, etc. when a sheet is flipped over the easel. Configured as easel sheets, articles of the invention can provide desired writability over the entirety of the first (separation layer-bearing) surface while reducing or eliminating undesired binding of adhesive on an overlying sheet with the front of an underlying sheet.

In another embodiments, articles of the invention can be configured as writable labels, with full permanent adhesive coating on the back side arranged in a stacked or padded, linerless form. In such embodiments, the separation layer coating would cover at least that much of the first surface of the underlying sheet which corresponds to the adhesive-covered portion of the second surface of the overlying sheet. Use of relatively smaller particles may be preferred to enhance writability properties though use of relatively smaller particles may tend to impair desired release or separation properties.

In still other embodiments, articles of the invention can be configured as tapes, e.g., masking tape, etc. The surprising release properties of separation layers of the invention permits such tapes to be made with a variety of different adhesive coatings if desired, with the tape wound upon itself into roll form without any release liner.

EXAMPLES

The invention will be further understood with reference to the following illustrative examples.

Several abbreviations are used in the description of the Examples including the following:

| Abbreviation | Meaning |
| --- | --- |
| cc/rev | cubic centimeter/revolution |
| cm | centimeter |
| cm/min. | centimeter/minute |
| ° C. | Centigrade |
| g | gram |
| $g/m^2$ | gram/square meter |
| Hz | Hertz |
| lb | pound |
| mL | milliliter |
| mm | millimeter |
| m | meter |
| m/min | meter/minute |
| OD | outside diameter |
| oz. | ounce |

-continued

| Abbreviation | Meaning |
| --- | --- |
| RH | relative humidity |
| RPM | revolution/minute |
| μm | micrometer (or micron) |

Raw Materials

The following raw materials were used in the examples.

| Tradename | Material |
| --- | --- |
| AC2523 | Acrylic dispersion from Alberdingk Boley |
| AIRFLEX ™ 192 | Vinyl acetate-ethylene emulsions from Air Products |
| AQUATAC ™ 6085 | Rosin ester tackifier from Arizona Chemical Co. |
| CARBOSET ™ AE960 | Acrylic polymer from Lubrizol |
| DUROSET ™ E-230 | Vinyl acetate-ethylene emulsion from Celanese |
| ECCO ™ Resin P-009 | Acrylics from Eastern Color & Chemical Co. |
| G-600 | Ceramic beads from Zeeospheres Ceramics, LLC. |
| GENCRYL ™ | Styrene-butadiene functional polymers from OMNOVA Solutions, Inc |
| HYCAR ™ 26083 | Acrylic polymer from Lubrizol |
| HYCAR ™ 26469 | Acrylic polymer from Lubrizol |
| HYSTRETCH ™ V-29 | Acrylic polymer from Lubrizol |
| JONCRYL ™ 74A | Modified styrene acrylic polymers from BASF |
| MR-30G | Cross linked acrylic from Esprix Technologies |
| M2064 | Acrylic dispersion from Alberdingk Boley |
| NATROSOL ™ 250H4R | Thickener from Hercules/Ashland |
| Q-CEL ™ 6048 | Hollow glass spheres from Potters Industries, LLC |
| RHOPLEX ™ A-920 | Acrylic polymer from Dow Chemical Co |
| RHOPLEX ™ NW-1725K | Acrylic polymer from Dow Chemical Co |
| S60 | Hollow glass microspheres from 3M Company |
| SIL-43 | Hollow glass particles from Silbrico Corporation |
| SPHERIGLASS ™ 3000 | Glass spheres from Potters Industries, LLC |
| SUNPMMA S300 | Polymethamethacrylate particles from Sunjin Chemical Co. |
| SUNPMMA ™ S400 | Polymethamethacrylate particles from Sunjin Chemical Co. |
| SUNSIL ™ 150H | Silica beads from Sunjin Chemical Co |
| SYNTHEMUL ™ 40 series | Acrylic latex from Reichhold |
| TROVIDUR ™ 600 Grade HPG | Stress relieved high density polyethylene Aeromat Plastics |
| U933 | Urethane dispersion from Alberdingk Boley, Inc |
| U6150 | Urethane dispersion from Alberdingk Boley, Inc |

Test Methods

The following test methods were used in the Examples.

Liner Removal Forces (LRF): Coated sheet samples of the separation layer were laminated against 2.54×10.16 cm strips of permanent adhesive paper office label stock (50 lb. Jetlaser RP54 2.7 mil white kraft paper, a 50 lignin-free, machine finished paper, 3.5 mil thick, with modified acrylic permanent adhesive, and 2.7 mil white kraft liner) from UPM Raflatac, from which the liner had been removed, with 2 passes of a 10 lb. roller at a rate of approximately 229 cm/min. Laminated sheets were stored in a constant temperature (21° C.) and relative humidity 50% RH room for at least 3 days before testing initial values. Two additional sets of laminated sheets were stored in a 48.8° C. constant heat temperature oven chamber and a 21° C./80% RH constant humidity chamber for two weeks. The samples were brought back to the 21° C./50% RH room and allowed to equilibrate for at least 24 hours prior to testing. Liner removal forces were tested by peeling the adhesive label strips from the release surface at 90° peel angle at a rate of 30.5 cm/min using a standard tensile tester Instron machine fitted with a 200 lb. load cell and integrating over at least 5 cm of peel. LRF data points are reported in grams/cm as the average value of 5 repetitions. A sample of the permanent adhesive paper office label stock was re-laminated to itself as above and used as a control test coupon.

Re-Adhesions to High Density Polyethylene: Coated sheet samples of the separation layer were laminated and conditioned in the same manner as in the LRF test method above. After the LRF was measured as above, the label adhesive strip was re-adhered to a 5.1×12.7 cm and 0.48 cm thick panels of high density polyethylene (Grade HPG TROVIDUR™ 600 Stress Relieved from Aeromat Plastics). Re-Adhesions to high density polyethylene were tested by peeling the adhesive label strips from the high density polyethylene panels at a 90° degree peel angle at a rate of 30.5 cm/min. Re-Adhesion data points are reported in grams/cm as the average value of 5 repetitions. A sample of permanent adhesive paper office label stock from UPM Raflatac was re-laminated to itself as above and used as a control test coupon.

Recyclability Testing: Recyclability was determined by following the USPS Laboratory Recycling Protocol—USPS Document dated February, 1999. Handsheets were made following TAPPI T-205.

Examples 1-19

To an 8 oz. glass jar was added 10 grams of MR-30G and 68 grams of deionized water. After mixing gently with an overhead stirrer, 21.5 grams of JONCRYL™ 74A was added with stirring giving a binder to particle weight ratio of 1.05:1. Lastly, 0.5 grams of NATROSOL™ 250H4R was added and stirring was continued for approximately 15 minutes until the solution thickened giving a 21% solids solution.

This mixture was coated on an approximately 15×60 cm portion white 3.5 mil thick paper with a slot die about 7 cm wide and height of 0.127 mm. The coated sample was placed in the oven for 15 minutes at 65.5° C. Next, the coated portion was over-coated with 10% solids KF-2001 LAB with a Meyer rod RDS #3. After drying the sample in the oven for another 15 minutes at 65.5° C., the sample was allowed to come to room temperature and then qualitatively evaluated for release from a permanent adhesive and writability performance. Examples 2 to 19 were made in a similar manner.

Examples 20-24

Pilot coatings were made as in Example 1 except components were mixed in a 32 oz. jar and thickened with 1 to 1.25% NATROSOL™ 250H4R.

These mixtures were coated onto paper using a slot die with slot height of 0.178 mm and opening of 12.7 cm connected to a peristaltic pump with capacity of 2.24 cc/rev and fitted with tubing of diameter 6.35 mm nominal OD. The mixture was pumped at 31 RPMs with a web speed of 9.2 m/min. The measured dry coating weight of particles and binder was 11 g/m².

Next, the KF-2001 was over-coated with either of a two methods. A 10% solids KF-2001 LAB solution was coated with a slot die with slot height of 0.127 mm and opening of 12.7 cm connected to a Zenith pump with capacity of 1.168 cc/rev. The solution was coated at 22 RPMs giving a dry coating weight of approximately 2.1 g/m². Or a 25% solids KF-2001 LAB solution was coated with a forward offset gravure roll coater (14.9 BCM roll) at a web speed of 7.6 m/min giving a dry coating weight of approximately 2.0 g/m². Drying for both coatings was done by passing the web over a steel wheel of 1.2 m diameter fitted with 4 infrared drying lamps set at 65.5° C. followed by one pass through two hot cans of 0.21 m diameter set at 149° C. Examples 21 to 24 were made in a similar manner.

To make permanent padded (linerless) labels, a portion from the coated roll of Example 20 was coated with a waterbased permanent adhesive on the backside of the sheet. To a 32 oz. jar was added 501 grams of a water-based acrylic latex PSA prepared by emulsion polymerization and 195 grams of AQUATAC™ 6085 with stirring until it became homogeneous. Several drops of 10% ammonium hydroxide were added to bring the mixture to pH 9. This 57% solids adhesive in water was coated on the backside of example 20 using a slot die with slot height of 0.178 mm and opening of 13.0 cm connected to a peristaltic pump with capacity of 2.24 cc/rev and fitted with tubing of diameter 6.35 mm nominal OD. The mixture was pumped at 20 RPM with a web speed of 9.2 m/min giving a dry adhesive thickness of approximately 22 microns. Drying was conducted in the same manner as above and the coated sheet was formed into individual 15.2×25.4 cm sheets and stacked into pads of permanent adhesive labels. Qualitatively, release of one sheet from another from the pad of labels was easy and writability of the sheet was rated to be good. In addition, release from one sheet from another remained stable over time.

Examples 25-26

To a one liter container was added 400 grams of 30% solids KF-2001 LAB solution, 435 grams of de-ionized water, and 167 grams of JONCRYL™ 74A with stirring to make a LAB premix solution. To a 32 oz. glass jar was added 68 grams of SPHERIGLASS™ 3000 and 427 grams of water with vigorous stirring. Next, 158 grams of JONCRYL™ 74A, 75 grams of the LAB premix, and 6.5 grams of NATROSOL™ 250HHR were added with stirring to make example 25. Another sample was made as above with 36 grams of SUNPMMA S300, 36 grams of SUNPMMA™ S400, 429 grams of de-ionized water, 189 grams of JONCRYL™ 74A, 75 grams of the LAB premix, and 6.5 grams of NATROSOL™ 250HHR to make example 26.

These mixtures were coated onto paper using a slot die with slot height of 0.178 mm and opening of 12.7 cm connected to a peristaltic pump with capacity of 2.24 cc/rev and fitted with tubing of diameter 6.35 mm nominal OD. The mixture was pumped at 13 and 9.3 RPMs with a web speed of 9.2 m/min. to give a measured dry coating weight of particles, binder, and release agent of 11 and 8 g/m² for examples 25 and 26, respectively. Drying for both coatings was done by passing the web over a steel wheel of 1.2 m diameter fitted with 4 infrared drying lamps set at 135° C.

An 18 gram sample from example 23 was cut into approximately 0.64 cm×28 cm strips via a paper shredder. These strips were mixed with 342 grams of copy paper cut likewise. The paper strips were placed in bucket and 2,040 grams of filtered water that was brought to pH 10 with 1 mL of 10% NaOH was added. The contents of the bucket were placed in an Adirondack pulper with the temperature set to 40.6° C. The pulper was gradually ramped up in speed from 10 Hz to 41 Hz and pulping was continued for 4 minutes. This was repeated and then the speed was slowed to 20 Hz while another 4800 mL of filtered water at 46.1° C. was added. After 5 minutes of pulping, the mixture was transferred to a large container and enough filtered water added to bring the total volume to 37.8 liters. The mixture was mixed lightly for 15 minutes. A 3,750 mL sample of this mixture was transferred to 18.9 liter bucket containing 7,500 mL of cold filtered water with light stirring to avoid forming any vortex. Portions of this mixture were used to make several handsheets of 15.2 cm diameter and approximately 1.2 grams weight at 50% RH per Tappi T-205. Another 18 gram sample was made as above using the 2.7 mil white Kraft liner from the UPM Raflatac permanent adhesive office labels described above. Visual observation with light enhancement indicated the presence of numerous opaque pieces of material present in the handsheets made from the liner sample while the handsheets from the separation layer sample, example 23 were essentially devoid of such opaque pieces of material.

Separation Layers for Examples 1-26

| Example | Particles | Avg. Particle Size (μm) | Binder | Weight Ratio: Binder to Particles | Total % Solids in Water | Substrate |
|---|---|---|---|---|---|---|
| 1 | MR-30G | 30 | JONCRYL ™ 74-A | 1.05:1 | 21 | paper |
| 2 | SUNPMMA-S300 | 27 | JONCRYL ™ 74-A | 1.3:1 | 18 | paper |
| 3 | SUNPMMA-S400 | 33 | JONCRYL ™ 74-A | 1.3:1 | 18 | paper |
| 4 | MR-30G | 30 | JONCRYL ™ 74-A | 1.4:1 | 19 | paper |
| 5 | SUNSIL 150H | 15 | JONCRYL ™ 74-A | 1.05:1 | 21 | paper |
| 6 | SIL-CEL 43/BC | 35 | JONCRYL ™ 74-A | 3.5:1 | 14 | paper |
| 7 | SPHERIGLASS 3000 | 35 | JONCRYL ™ 74-A | 1.0:1 | 20 | paper |

-continued

| Example | Particles | Avg. Particle Size (μm) | Binder | Weight Ratio: Binder to Particles | Total % Solids in Water | Substrate |
|---|---|---|---|---|---|---|
| 8 | SUNPMMA-S400 | 33 | ALBERDINGK ™ AC2523 | 1.3:1 | 18 | paper |
| 9 | SUNPMMA-S400 | 33 | ALBERDINGK ™ U6150 | 1.3:1 | 18 | paper |
| 10 | SUNPMMA-S400 | 33 | ALBERDINGK ™ U933 | 1.3:1 | 18 | paper |
| 11 | SUNPMMA-S400 | 33 | ALBERDINGK ™ M2064 | 1.3:1 | 18 | paper |
| 12 | SUNPMMA-S400 | 33 | JONCRYL ™ 74-A and ALBERDINGK ™ 2389 (1:1) | 1.3:1 | 18 | paper |
| 13 | SUNPMMA-S400 | 33 | JONCRYL ™ 74A | 1.5:1 | 19 | Primed Polyester film |
| 14 | IOA/HDDA | 56 | SYNTHEMUL ™ | 1.1:1 | 22 | paper |
| 15 | IOA/HDDA | 56 | HYCAR ™ 26469 | 1.1:1 | 22 | paper |
| 16 | 2-EHA/HDDA | 50 | AIRFLEX ™ 192 | 1.0:1 | 20 | paper |
| 17 | 2-EHA/HDDA | 50 | HYSTRETCH ™ V29 | 1.0:1 | 20 | paper |
| 18 | IOA/HDDA | 56 | CARBOSET ™ AE960 | 1.0:1 | 20 | paper |
| 19 | 2-EHA/HDDA | 62 | JONCRYL ™ 74-A | 1.05:1 | 21 | paper |
| 20 | MR-30G | 30 | JONCRYL ™ 74-A | 1.25:1 | 18 | paper |
| 21 | SUNPMMA-S300 | 27 | JONCRYL ™ 74-A | 1.3:1 | 18 | paper |
| 22 | SUMPMMA-S400 | 34 | JONCRYL ™ 74-A | 1.25:1 | 18 | paper |
| 23 | SUNPMMA-S400 | 34 | JONCRYL ™ 74-A | 1.3:1 | 18 | paper |
| 24 | 2-EHA/HDDA | 31 | JONCRYL ™ 74-A | 1.44:1 | 18 | paper |
| 25 | SPHERIGLASS 3000 | 35 | JONCRYL ™ 74-A | 1.34:1 | 21 | paper |
| 26 | SUNPMMA-S400/S300 | 31 | JONCRYL ™ 74-A | 1.37:1 | 24 | paper |

Liner Removal Force And Re-Adhesion Data
From Examples 20-26

| Release Surface | Initial LRF | Heat Aged LRF | Humidity Aged LRF | Initial Re-Adhesion | Heat Aged Re-Adhesion | Humidity Aged Re-Adhesion |
|---|---|---|---|---|---|---|
| Example 20 | 11 | 15 | 6 | 178 | 130 | 160 |
| Control | 8 | 9 | 8 | 199 | 177 | 182 |
| Example 21 | 20 | 46 | 19 | 191 | 116 | 156 |
| Example 22 | 8 | 5 | 7 | 204 | 159 | 172 |
| Control | 7 | 9 | 10 | 234 | 201 | 219 |
| Example 23 | 7 | 15 | 11 | 196 | 152 | 155 |
| Example 24 | 11 | 21 | 16 | 180 | 142 | 143 |
| Control | 5 | 7 | 7 | 211 | 205 | 200 |
| Example 25 | 7 | 8 | 9 | 204 | 190 | 185 |
| Example 26 | 8 | 11 | 6 | 201 | 181 | 190 |
| Control | 5 | 7 | 6 | 200 | 201 | 191 |

Although the present invention has been fully described in connection with the preferred embodiments thereof, it is to be noted that various changes and modifications are apparent to those skilled in the art. Such changes and modifications are to be understood as included within the scope of the present invention as defined by the appended claims unless they depart therefrom. The complete disclosure of all patents, patent documents, and publications cited herein are incorporated by reference.

What is claimed is:

1. An article comprising:
   (1) a base comprising paper and having a first surface; and
   (2) a separation layer on at least a portion of the first surface of the base, wherein the separation layer comprises
      (a) a layer of water-dispersible binder having a $T_g$ from about −30° C. to about +30° C.;
      (b) spherical particles partially entrained in and protruding from the binder; and
      (c) a water-dispersible release agent including at least one of a vinyl-silicone polymer, a long chain aliphatic-containing urethane copolymer, a long chain aliphatic-containing acrylate copolymer, a silicone/polyurea copolymer, and a silicone polyamide copolymer;
   wherein the article is recyclable.

2. The article of claim 1 wherein the base has a second surface and further comprises adhesive on at least a portion of the second surface.

3. The article of claim 1 wherein the base consists essentially of a sheet of paper.

4. The article of claim 1 wherein the binder layer comprises one or more resins selected from the group consisting of: modified styrene acrylic polymers, acrylic polymers, acrylic latexes, vinyl acetate-ethylene emulsions, acrylic dispersions, styrene-butadiene functional polymers, polyvinyl alcohols, acrylics, and urethane dispersions.

5. The article of claim 1 wherein the $T_g$ of the binder is from about −20° C. to about +10° C.

6. The article of claim 1 wherein the $T_g$ of the binder is from about −15° C. to about 0° C.

7. The article of claim 1 wherein the particles are selected from the group consisting of organic particles and inorganic particles.

8. The article of claim 1 wherein the particles are selected from the group consisting of hollow or solid particles.

9. The article of claim 1 wherein the particles are selected from the group consisting of: polymer, glass, or ceramic.

10. The article of claim 1 wherein the particles have an average size from about 5 to about 200 microns.

11. The article of claim 1 wherein the particles have an average size from about 5 to about 60 microns.

12. The article of claim 1 wherein the particles have an average size from about 10 to about 50 microns.

13. The article of claim 1 wherein the particles have an average size from about 20 to about 40 microns.

14. The article of claim 1 wherein the separation layer has a dry coating weight of from about 5 to about 15 g/m².

15. The article of claim 1 wherein the separation layer has a dry coating weight of from about 7 to about 12 g/m².

16. The article of claim 1 wherein the separation layer has a dry coating weight of from about 8 to about 11 g/m².

17. The article of claim 1 wherein the first surface and the separation layer coating has a mean height from about 10 to about 50 microns, a mean equivalent circular diameter (ECD) from about 50 to about 100 microns, and a mean nearest neighbor distance (NND) from about 50 to about 150 microns.

18. The article of claim 1 wherein the water-dispersible release agent is incorporated in the binder layer.

19. The article of claim 1 wherein the water-dispersible release agent is an overcoat on the face of the separation layer.

20. The article of claim 1 wherein the first surface and the separation layer are writable.

21. The article of claim 1 wherein the article is wound upon itself into roll form.

22. The article of claim 1 wherein the article is in a stack of similar articles with the second surface of an overlying article contacting the first surface of an underlying article.

23. A method of making the article of claim 1 comprising providing a base having a first surface and forming a separation layer on at least a portion of the first surface of the base.

24. The method of claim 23 wherein forming the separation layer comprises applying a coating composition comprising binder and particles and drying.

25. The method of claim 24 wherein the coating composition comprises release agent.

26. The method of claim 24 further comprising, after applying the binder and particles to the surface of the base, applying a release agent overcoat to the binder and particles.

27. A method comprising: (1) providing the article of claim 1 wherein the base comprises a water dispersible material and, and after use of such article, (2) placing the article in water, (3) water dispersing the article, and (4) recovering the base material.

28. The method of claim 27 wherein the base has a second surface and the article further comprises adhesive on at least a portion of the second surface, and wherein the method further comprises separating the separation layer from the adhesive.

29. The method of claim 27 wherein (i) the base has a second surface and the article further comprises adhesive on at least a portion of the second surface and (ii) the article is in an assembly comprising either (A) the article wound upon itself into roll form or (B) arranged in a stack of similar articles with the second surface of an overlying article contacting the first surface of an underlying article, and wherein the method further comprises, prior to placing the article in water, separating the article from the assembly.

* * * * *